United States Patent
Lee et al.

(10) Patent No.: US 9,832,704 B2
(45) Date of Patent: Nov. 28, 2017

(54) METHOD AND USER TERMINAL FOR DYNAMICALLY CONTROLLING ROUTING

(71) Applicant: Electronics and Telecommunications Research Institute, Daejeon (KR)

(72) Inventors: Je Hun Lee, Daejeon (KR); Joon Soo Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 147 days.

(21) Appl. No.: 14/591,881

(22) Filed: Jan. 7, 2015

(65) Prior Publication Data

US 2015/0195766 A1  Jul. 9, 2015

(30) Foreign Application Priority Data

Jan. 8, 2014 (KR) .................. 10-2014-0002169

(51) Int. Cl.
| | |
|---|---|
| *H04W 40/04* | (2009.01) |
| *H04W 88/06* | (2009.01) |
| *H04W 40/02* | (2009.01) |
| *H04W 28/02* | (2009.01) |
| *H04W 40/16* | (2009.01) |
| *H04W 48/18* | (2009.01) |
| *H04L 12/707* | (2013.01) |

(52) U.S. Cl.
CPC ....... *H04W 40/02* (2013.01); *H04W 28/0284* (2013.01); *H04W 40/04* (2013.01); *H04L 45/24* (2013.01); *H04W 40/16* (2013.01); *H04W 48/18* (2013.01); *H04W 88/06* (2013.01)

(58) Field of Classification Search
CPC ...... H04W 88/06; H04W 40/02; H04W 40/04
See application file for complete search history.

(56) References Cited

U.S. PATENT DOCUMENTS

| | | | |
|---|---|---|---|
| 2014/0043966 A1* | 2/2014 | Lee | H04W 28/08 370/230 |
| 2015/0105076 A1* | 4/2015 | Gupta | H04W 24/06 455/435.3 |

FOREIGN PATENT DOCUMENTS

| | | |
|---|---|---|
| KR | 10-1348623 B1 | 1/2014 |
| KR | 10-1476213 B1 | 12/2014 |
| WO | WO 2012/047019 A2 | 4/2012 |

\* cited by examiner

*Primary Examiner* — Hoon J Chung

(57) ABSTRACT

A method and user terminal for dynamically controlling routing are provided. The method may provide an effective routing mechanism in a system to which a plurality of radio access technologies (RATs) are applied. The method may perform routing based on characteristics of the RATs, a degree of a generated traffic load, a user preference of a RAT, and the like.

15 Claims, 4 Drawing Sheets

FIG. 2

| RAT # | Resource Usage Index (RUI) | Preferred QoS Index (PQI) | Interference Index (IFI) | Network Cost Index (NCI) | Mobility Category Index (MCI) |
|---|---|---|---|---|---|

Multi-RAT Resource Index Table (MRIT)

METHOD AND USER TERMINAL FOR DYNAMICALLY CONTROLLING ROUTING

CROSS-REFERENCE TO RELATED APPLICATION

This application claims the benefit of Korean Patent Application No. 10-2014-0002169, filed on Jan. 8, 2014, in the Korean Intellectual Property Office, the disclosure of which is incorporated herein by reference.

BACKGROUND

1. Field of the Invention

The present invention relates to a technology of effectively controlling routing in a user terminal to which a plurality of radio access technologies (RATs) are applied.

2. Description of the Related Art

Due to development and miniaturization of various radio access technologies (RATs), a chip equipped with all of a plurality of RATs is being produced. The RATs in the chip inevitably require a medium access control (MAC) technology corresponding to each of the RATs. Accordingly, actually, a MAC technology may be gradually complicated and diversified, while requiring high-speed processing.

The above phenomena may be found in smartphones upgraded every day and released. Because a wireless fidelity (Wi-Fi) technology is being popularized and a large capacity of traffic is being processed through the Wi-Fi technology, a smartphone equipped with a chip with a plurality of RATs including the Wi-Fi technology is being released.

Accordingly, a demand for a technology for effectively processing traffic by routing a plurality of RATs is increasing. In other words, there is a desire for a technology for effectively utilizing a plurality of RATs applied to a smartphone, and the like.

SUMMARY

An aspect of the present invention provides a method and apparatus that may dynamically perform routing by sharing resource indices in a memory corresponding to a medium access control (MAC) layer of a plurality of radio access technologies (RATs), and may efficiently perform a communication.

Another aspect of the present invention provides a method and apparatus that may effectively control routing by sharing only information on software while utilizing hardware of an existing RAT/MAC layer without a change.

Still another aspect of the present invention provides a method and apparatus that may use a traffic control command by utilizing a tool provided by an existing operating system (OS) without a change, and may design only information and a procedure required to control traffic, to effectively control traffic generated in a user terminal.

According to an aspect of the present invention, there is provided a method of dynamically controlling routing, the method being performed by a user terminal, and including: identifying at least one resource index associated with each of a plurality of radio access technologies (RATs); determining a routing value of each of the RATs based on the at least one resource index; and routing the RATs based on the routing value.

The identifying may include identifying a resource index including at least one of a resource usage index (RUI), a preferred quality of service (QoS) index (PQI), an interference index (IFI), a network cost index (NCI), and a mobility category index (MCI) of each of the RATs.

The identifying may include identifying a resource index based on an index table read from a memory corresponding to a medium access control (MAC) layer of each of the RATs.

The determining may include determining a routing value based on a first resource index and a second resource index, the first resource index being changed adaptively based on traffic determined by a data communication performed by the user terminal, and the second resource index being determined based on an attribute of each of the RATs.

The determining may include determining a routing value by applying a user index weight (UIW) set by a user to the at least one resource index.

According to another aspect of the present invention, there is provided a method of dynamically controlling routing, the method being performed by a user terminal, and including: storing, in a memory, a resource index associated with each of a plurality of RATs; identifying the resource index in an index table read from the memory, when the user terminal satisfies a condition required to perform dynamic routing; determining a routing value of each of the RATs by applying a UIW set by a user to the resource index; and routing the RATs based on the routing value, wherein the resource index includes a first resource index changed adaptively based on traffic determined by a data communication performed by the user terminal, and a second resource index determined based on an attribute of each of the RATs.

The identifying may include, when a traffic load of the user terminal exceeds a predetermined threshold, identifying the resource index in the index table.

The first resource index may include at least one of an RUI, and an IFI of each of the RATs, and the second resource index may include at least one of a PQI, an NCI, and an MCI of each of the RATs.

The RUI may indicate an internal resource use state in a MAC layer of each of the RATs.

The PQI may indicate which QoS of traffic is preferred based on a characteristic of each of the RATs.

The IFI may indicate a state of a channel environment of each of the RATs.

The NCI may indicate costs incurred by using each of the RATs.

The MCI may indicate a mobility of each of the RATs.

According to another aspect of the present invention, there is provided a user terminal including: an identification unit to identify at least one resource index associated with each of a plurality of RATs; a determination unit to determine a routing value of each of the RATs based on the at least one resource index; and a routing unit to route the RATs based on the routing value.

The identification unit may identify a resource index including at least one of an RUI, a PQI, an IFI, an NCI, and an MCI of each of the RATs.

The identification unit may identify a resource index based on an index table read from a memory corresponding to a MAC layer of each of the RATs.

The determination unit may determine a routing value based on a first resource index and a second resource index. The first resource index may be changed adaptively based on traffic determined by a data communication performed by the user terminal, and the second resource index may be determined based on an attribute of each of the RATs.

The determination unit may determine a routing value by applying a UIW set by a user to the at least one resource index.

According to another aspect of the present invention, there is provided a user terminal for performing dynamic routing, the user terminal including: a storage unit to store, in a memory, a resource index associated with each of a plurality of RATs; an identification unit to identify the resource index in an index table read from the memory, when the user terminal satisfies a condition required to perform dynamic routing; a determination unit to determine a routing value of each of the RATs by applying a UIW set by a user to the resource index; and a routing unit to route the RATs based on the routing value, wherein the resource index includes a first resource index changed adaptively based on traffic determined by a data communication performed by the user terminal, and a second resource index determined based on an attribute of each of the RATs.

When a traffic load of the user terminal exceeds a predetermined threshold, the identification unit may identify the resource index in the index table.

EFFECT

According to embodiments of the present invention, routing may be dynamically performed by sharing resource indices in a memory corresponding to a medium access control (MAC) layer of each of a plurality of radio access technologies (RATs) and thus, it is possible to efficiently perform a communication.

Additionally, according to embodiments of the present invention, hardware of an existing RAT/MAC layer may be utilized without a change, and only information on software may be shared and thus, it is possible to effectively control routing.

Furthermore, according to embodiments of the present invention, a traffic control command may be used by utilizing a tool provided by an existing operating system (OS) without a change, and only information and a procedure required to control traffic may be designed and thus, it is possible to effectively control traffic generated in a user terminal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a diagram illustrating a multi-RAT resource index table according to an embodiment;

DETAILED DESCRIPTION

Figure 1:
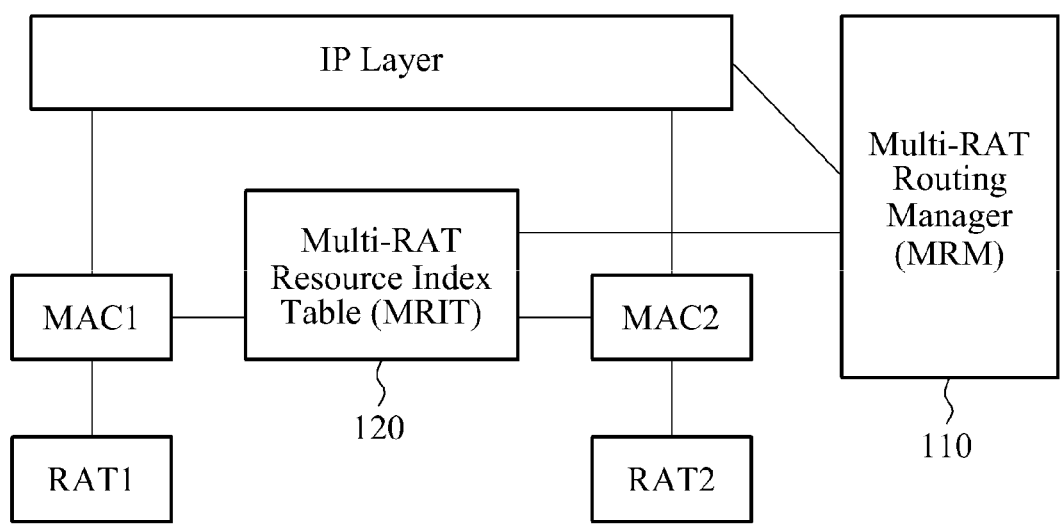
FIG. 1 is a diagram illustrating a multi-radio access technology (RAT) routing manager and a multi-RAT resource index table stored in a memory corresponding to a medium access control (MAC) layer according to an embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a multi-radio access technology (RAT) routing manager 110 and a multi-RAT resource index table 120 stored in a memory corresponding to a medium access control (MAC) layer according to an embodiment.

The multi-RAT routing manager 110, hereinafter referred to as the MRM 110, may be built in a user terminal used to perform a communication using a plurality of RATs. The MRM 110 may perform routing using one of the RATs, and may allow the user terminal to perform an effective communication. Hereinafter, the MRM 110 may be described as a user terminal for clarity and conciseness of description.

For example, a plurality of RATs may be applied to a user terminal. In this example, a memory corresponding to a MAC layer may be assigned to each of the RATs. Referring to FIG. 1, MAC1 and MAC2 may be assigned to RAT1 and RAT2, respectively.

MAC1 and MAC2 may share the multi-RAT resource index table 120 associated with RAT1 and RAT2. The multi-RAT resource index table 120 may include at least one of a resource usage index (RUI), a preferred quality of service (QoS) index (PQI), an interference index (IFI), a network cost index (NCI), and a mobility category index (MCI) of each RAT. Hereinafter, a multi-RAT resource index table may be referred to as an MRIT for clarity and conciseness of description. The MRIT is further described with reference to FIG. 2.

FIG. 2 is a diagram illustrating an MRIT according to an embodiment.

The MRIT may include a plurality of resource indices of each of RATs. For example, the MRIT may include at least one of an RUI, a PQI, an IFI, an NCI and an MCI of each of RATs.

A resource index may be defined as a numeral in an arbitrary range. Various ranges may be defined based on a field to which various ranges are to be applied. For example, a resource index may be defined as a numeral of 1 to 10 for convenience.

The RUI may indicate an internal resource use state in a MAC layer of a RAT. For example, an RUI close to "10" may indicate that a large number of internal resources of a RAT is being used. The RUI may be updated while processing traffic through a corresponding RAT. For example, a low RUI may indicate a high traffic load at a corresponding point in time.

The PQI may indicate which QoS of traffic is preferred due to a characteristic of a RAT. For example, the PQI may indicate whether a corresponding RAT is suitable for traffic sensitive to a delay, or traffic associated with high-speed and large-capacity transmission. In this example, the PQI may be mapped to access categories 0 to 3 that are defined as typical QoS categories in a wireless-fidelity (Wi-Fi). Access categories may be based on an internal Q state. However, the PQI may not necessarily be limited to access categories, and may have various categories.

The IFI may indicate a state of a channel environment of a RAT. For example, the IFI may represent a channel state determined based on a received signal strength indicator (RSSI) value measured by a RAT. A user terminal may determine a state of a channel environment of a RAT, based on the IFI.

The NCI may indicate costs incurred by using a RAT. The NCI may be appropriately set based on a free RAT, for example a Wi-Fi, and a charged RAT, for example, a long-term evolution (LTE).

For example, a lower NCI may indicate a lower cost incurred by using a corresponding RAT. The NCI may be arbitrarily set to represent a zero cost, a low cost, a medium cost, and a high cost.

The MCI may indicate a mobility of a RAT. For example, the MCI may be set to indicate a zero speed, a low speed, a medium speed, and a high speed. The zero-speed may indicate, for example, a fixation in a specific position.

For example, an MCI of "0" may indicate a zero speed, that is, a fixation, and an MCI of "1" may indicate a low speed. Additionally, an MCI of "2" may indicate a medium speed, and an MCI of "3" may indicate a high speed. A RAT with an MCI of "1" may indicate, for example, a RAT that is available even when a user is walking.

The resource indices stored in the MRIT may be classified as a first resource index and a second resource index. The first resource index may be changed adaptively based on traffic determined by a data communication performed by a user terminal. The second resource index may be determined based on an attribute of a RAT.

The first resource index may include at least one of an RUI and an IFI. In other words, the RUI may be updated based on an internal resource use state. Additionally, the IFI may be updated based on an RSSI value measured using a RAT.

The second resource index may include at least one of a PQI, an NCI, and an MCI. In other words, the PQI, the NCI, and the MCI may be determined based on the attribute of the RAT.

The above-described resource indices may be used together with a user index weight (UIW) set by a user. The UIW may be set by a user, and may be applied to each of resource indices. For example, a UIW1, a UIW 2, a UIW3, a UIW4, and a UIW5 may be applied to an RUI, a PQI, an IFI, an NCI, and an MCI, respectively.

A user terminal may determine a routing value by applying a UIW to a resource index. For example, the user terminal may determine a routing value of a RAT by calculating "RUI*UIW1+PQI*UIW2+IFI*UIW3+NCI*UIW4+MCI*UIW5". The user terminal may perform routing using a RAT with a maximum routing value.

Figure 3:
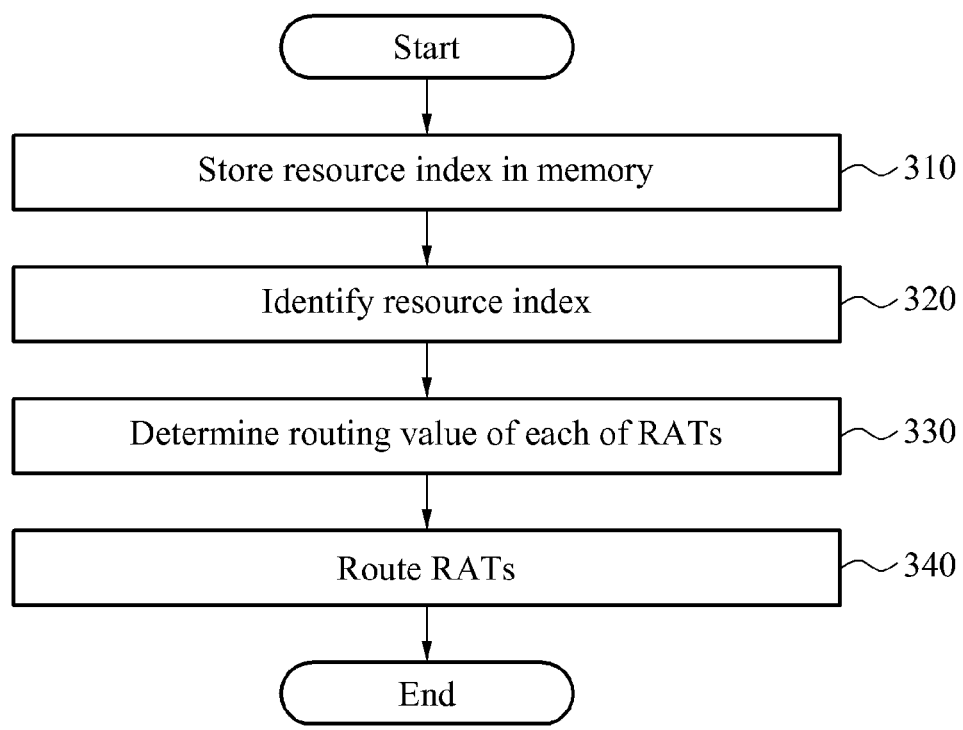
FIG. 3 is a flowchart illustrating a method of dynamically controlling routing according to an embodiment.

FIG. 3 is a flowchart of a method of dynamically controlling routing according to an embodiment.

The method of FIG. 3 may be performed by a processor included in a user terminal Referring to FIG. 3, in operation 310, the user terminal may store, in a memory, resource indices associated with each of a plurality of RATs. For example, the user terminal may store, in the memory, resource indices associated with each of the RATs in the form of an MRIT. Additionally, the user terminal may store the MRIT in a memory corresponding to a MAC layer of each of the RATs.

The MRIT may include at least one of an RUI, a PQI, an IFI, an NCI, and an MCI. Resource indices stored in the MRIT may be classified as a first resource index and a second resource index. The first resource index may be changed adaptively based on traffic determined by a data communication performed by a user terminal. The second resource index may be determined based on an attribute of a RAT.

In operation 320, the user terminal may identify at least one of the resource indices. The user terminal may identify resource indices based on an MRIT read from a memory corresponding to a MAC layer of each of the RATs. For example, the user terminal may look up the MRIT, and may identify at least one resource index.

For example, the user terminal may set a point in time at which routing is to be performed, and may identify at least one resource index in an MRIT, based on the set point in time. In other words, when a condition required to perform dynamic routing is satisfied, the user terminal may identify a resource index.

In an example, the user terminal may identify at least one resource index in the MRIT in real time. In another example, when an arbitrary traffic stream (TS) is generated, the user terminal may identify at least one resource index in the MRIT. In still another example, when a traffic load of the user terminal exceeds a predetermined threshold, the user terminal may identify at least one resource index in the MRIT. However, there is no limitation to the above scheme, and the user terminal may identify at least one resource index based on a point in time for routing that is set by various schemes based on a political algorithm.

In operation 330, the user terminal may determine a routing value of each of the RATs based on the resource indices. The user terminal may determine the routing value, based on the first resource index and the second resource index. As described above, the first resource index may be changed adaptively based on traffic determined by a data communication performed by a user terminal, and the second resource index may be determined based on an attribute of a RAT.

For example, the user terminal may look up a UIW set by a user. The UIW set by a user may be applied to each resource index.

The user terminal may apply a UIW to a resource index, and may determine a routing value. For example, the user terminal may determine a routing value of a RAT by calculating "RUI*UIW1+PQI*UIW2+IFI*UIW3+NCI*UIW4+MCI*UIW5."

In other words, different results may be obtained from the same resource index, based on which weight is applied to each of resource indices. Additionally, a UIW of a resource index in which a user is not interested may be set to "0" and accordingly, the user terminal may determine a routing value by excluding the resource index.

In operation 340, the user terminal may route the RATs based on the determined routing value. For example, the user terminal may perform routing using a RAT with a maximum routing value among determined routing values.

The user terminal may set a point in time at which routing is to be performed. In an example, the user terminal may perform routing in real time. In another example, when an arbitrary TS is generated, the user terminal may perform routing. In still another example, when a traffic load of the user terminal exceeds a predetermined threshold, the user terminal may perform routing. However, there is no limitation to the above scheme, and the user terminal may perform routing based on a point in time for routing that is set by various schemes based on a political algorithm.

The method of FIG. 3 may be performed. For example, a user may set one of resource indices as a key resource index, and a user terminal may perform routing based on the key resource index. For example, when a user sets an NCI as a key resource index, a RAT may include the following resource indices:

1. RUI: 7 (High resource usage)
2. PQI: 8 (Value mapped to AC3, suitable for traffic sensitive to a delay)
3. IFI: 2 (Good channel environment)
4. NCI: 0 (Free of charge)
5. MCI: 0 (Fixation)

Additionally, UIWs set by a user may have the following values:

1. UIW1: 0
2. UIW2: 1
3. UIW3: 0
4. UIW4: 1
5. UIW5: 0

In other words, the user may use a PQI in addition to the NCI set as a key resource index. For example, the user may enable a communication to be performed through a free RAT, and may prefer traffic with the same PQIs, if possible. Accordingly, the user may desire to use even a free Internet telephone.

Additionally, operations 320 to 340 may be performed at regular intervals. For example, the user terminal may statically or dynamically perform operations 320 to 340.

When a point in time for routing remains unchanged, the user terminal may dynamically control routing only at an initial point in time at which an arbitrary TS is generated, and may perform a communication so that resource indices may be fixed during generation of the TS.

When a point in time for routing is changed, the user terminal may dynamically control routing at a point in time at which a traffic load of the user terminal exceeds a predetermined threshold while monitoring the traffic load. In this example, the predetermined threshold may be arbitrarily set by a user.

Figure 4:
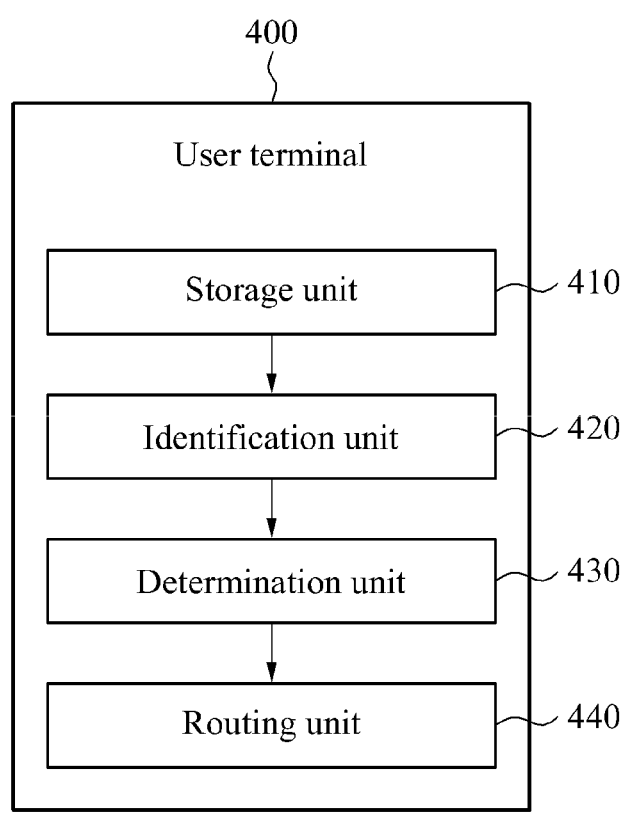
FIG. 4 is a block diagram illustrating a configuration of a user terminal according to an embodiment.

FIG. 4 is a block diagram illustrating a configuration of a user terminal 400 according to an embodiment.

Referring to FIG. 4, the user terminal 400 may include a storage unit 410, an identification unit 420, a determination unit 430, and a routing unit 440. The user terminal 400 may include, for example, an apparatus enabling a communication via a plurality of RATs. The RATs may include, for example, a Wi-Fi, a Bluetooth, a third generation (3G), an LTE, and the like, but there is no limitation thereto. Accordingly, the RATs may include all RATs enabling a communication.

The storage unit 410 may store, in a memory, resource indices associated with each of a plurality of RATs. The storage unit 410 may store resource indices in the form of an MRIT in a memory corresponding to a MAC layer of each of the RATs.

The MRIT may include a plurality of resource indices of each of the RATs. For example, the MRIT may include at least one of an RUI, a PQI, an IFI, an NCI and an MCI of each of the RATs.

The resource indices stored in the MRIT may be classified as a first resource index and a second resource index. The first resource index may be changed adaptively based on traffic determined by a data communication performed by a user terminal. The second resource index may be determined based on an attribute of a RAT.

The identification unit 420 may identify at least one resource index associated with each of a plurality of RATs. For example, the identification unit 420 may look up an MRIT including at least one resource index, and may identify a resource index including at least one of an RUI, a PQI, an IFI, an NCI and an MCI of each of the RATs.

The identification unit 420 may identify at least one resource index in an MRIT, based on a set point in time at which routing is to be performed. In an example, the identification unit 420 may identify at least one resource index in the MRIT in real time. In another example, when an arbitrary TS is generated, the identification unit 420 may identify at least one resource index in the MRIT. In still another example, when a traffic load of the user terminal 400 exceeds a predetermined threshold, the identification unit 420 may identify at least one resource index in the MRIT.

The determination unit 430 may determine a routing value of each of the RATs based on the resource indices. For example, the determination unit 430 may determine the routing value, based on the first resource index and the second resource index. As described above, the first resource index may be changed adaptively based on traffic determined by a data communication performed by a user terminal, and the second resource index may be determined based on an attribute of a RAT.

Additionally, the determination unit 430 may determine a routing value by applying a UIW set by a user to a resource index. For example, the determination unit 430 may determine a routing value of a RAT by calculating "RUI*UIW1+PQI*UIW2+IFI*UIW3+NCI*UIW4+MCI*UIW5."

The routing unit 440 may route the RATs based on routing values determined by the determination unit 430. The routing unit 440 may perform routing using a RAT with a maximum routing value among the routing values determined by the determination unit 430.

The routing unit 440 may perform routing based on a point in time for routing that is set in advance. In an example, the routing unit 440 may perform routing in real time. In another example, when an arbitrary TS is generated, the routing unit 440 may perform routing. In still another example, when a traffic load of the user terminal 400 exceeds a predetermined threshold, the routing unit 440 may perform routing. However, there is no limitation to the above scheme, and the routing unit 440 may perform routing based on a point in time for routing that is set by various schemes based on a political algorithm.

For example, the routing unit 440 may perform routing using a tool, such as iproute2, provided by an operating system (OS), such as a Linux.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of dynamically controlling routing, the method being performed by a user terminal, and comprising:
   identifying at least one resource index associated with each of a plurality of radio access technologies (RATs), the at least one resource index comprising at least one of a resource usage index (RUI) of each of the RATs, a network cost index (NCI) of each of the RATs, and a mobility category index (MCI) of each of the RATs;
   determining a routing value of each of the RATs based on the at least one resource index; and
   routing the RATs based on the routing value,
   wherein the RUI indicates an internal resource use state in a medium access control (MAC) layer of each of the RATs,
   wherein the NCI indicates a cost incurred by using each of the RATs, and
   wherein the MCI indicates a mobility of each of the RATs.

2. The method of claim 1, wherein the identifying comprises identifying the at least one resource index based on an index table read from a memory corresponding to a medium access control (MAC) layer of each of the RATs.

3. The method of claim 1,
   wherein the at least one resource index includes a first resource index and a second resource index; and
   wherein the determining comprises determining the routing value based on the first resource index and the second resource index, the first resource index being changed adaptively based on traffic determined by a data communication performed by the user terminal, and the second resource index being determined based on an attribute of each of the RATs.

4. The method of claim 1, wherein the determining comprises determining the routing value by applying a user index weight (UIW) set by a user to the at least one resource index.

5. A method of dynamically controlling routing, the method being performed by a user terminal, and comprising:
   storing, in a memory, a resource index associated with each of a plurality of radio access technologies (RATs);
   identifying the resource index in an index table read from the memory, when the user terminal satisfies a condition required to perform dynamic routing;
   determining a routing value of each of the RATs by applying a user index weight (UIW) set by a user to the resource index; and
   routing the RATs based on the routing value,
   wherein the resource index comprises a first resource index changed adaptively based on traffic determined by a data communication performed by the user terminal, and a second resource index determined based on an attribute of each of the RATs, the second resource index comprising at least one of a network cost index (NCI) of each of the RATs and a mobility category index (MCI) of each of the RATs,
   wherein the NCI indicates a cost incurred by using each of the RATs, and
   wherein the MCI indicates a mobility of each of the RATs.

6. The method of claim 5, wherein the identifying comprises, when a traffic load of the user terminal exceeds a predetermined threshold, identifying the resource index in the index table.

7. The method of claim 5, wherein the first resource index comprises at least one of a resource usage index (RUI), and an interference index (IFI) of each of the RATs.

8. The method of claim 7, wherein the RUI indicates an internal resource use state in a medium access control (MAC) layer of each of the RATs.

9. The method of claim 7, wherein the IFI indicates a state of a channel environment of each of the RATs.

10. A user terminal, comprising:
    a processor; and
    a non-transitory computer-readable media including program instructions including program instructions for implementing operations of the user terminal,
    wherein the user terminal is configured to:
      identify at least one resource index associated with each of a plurality of radio access technologies (RATs), the at least one resource index comprising at least one of a resource usage index (RUT) of each of the RATs, a network cost index (NCI) of each of the RATs, and a mobility category index (MCI) of each of the RATs;
      determine a routing value of each of the RATs based on the at least one resource index; and
      route the RATs based on the routing value,
    wherein the RUI indicates an internal resource use state in a medium access control (MAC) layer of each of the RATs,
    wherein the NCI indicates a cost incurred by using each of the RATs, and
    wherein the MCI indicates a mobility of each of the RATs.

11. The user terminal of claim 10, wherein the user terminal identifies the at least one resource index based on an index table read from a memory corresponding to a medium access control (MAC) layer of each of the RATs.

12. The user terminal of claim 10, wherein the at least one resource index includes a first resource index and a second resource index; and wherein the user terminal determines the routing value based on the first resource index and the second resource index, the first resource index being changed adaptively based on traffic determined by a data communication performed by the user terminal, and the second resource index being determined based on an attribute of each of the RATs.

13. The user terminal of claim 10, wherein the user terminal determines the routing value by applying a user index weight (UIW) set by a user to the at least one resource index.

14. A user terminal for performing dynamic routing, the user terminal comprising:

a processor; and a storage unit to store, in a memory, a resource index associated with each of a plurality of radio access technologies (RATs), wherein the user terminal is configured to:
  identify the resource index in an index table read from the memory, when the user terminal satisfies a condition required to perform dynamic routing;
  determine a routing value of each of the RATs by applying a user index weight (UIW) set by a user to the resource index; and
  route the RATs based on the routing value, wherein the resource index comprises a first resource index changed adaptively based on traffic determined by a data communication performed by the user terminal, and a second resource index determined based on an attribute of each of the RATs, the second resource index comprising at least one of a network cost index (NCI) of each of the RATs and a mobility category index (MCI) of each of the RATs, wherein the NCI indicates a cost incurred by using each of the RATs, and wherein the MCI indicates a mobility of each of the RATs.

15. The user terminal of claim 14, wherein when a traffic load of the user terminal exceeds a predetermined threshold, the user terminal identifies the resource index in the index table.

\* \* \* \* \*